United States Patent [19]

Hoang

[11] 4,308,034
[45] Dec. 29, 1981

[54] APPARATUS FOR INCINERATING AND GASIFYING BIOMASS MATERIAL

[76] Inventor: Dinh C. Hoang, 311 E. Julia Way, Hanford, Calif. 93230

[21] Appl. No.: 151,371

[22] Filed: May 19, 1980

[51] Int. Cl.³ ............................. C10J 3/20; C10J 3/40
[52] U.S. Cl. ..................................... 48/111; 110/229; 110/230; 110/270; 202/117
[58] Field of Search ................... 48/89, 111, 119, 123; 202/117, 129, 134, 135; 110/270, 273, 229, 230

[56] References Cited

U.S. PATENT DOCUMENTS

| | | |
|---|---|---|
| 2,335,611 | 11/1943 | Pray ..................................... 202/117 |
| 3,434,933 | 3/1969 | Mansfield . |
| 3,870,652 | 3/1975 | Whitten et al. . |
| 3,985,637 | 10/1976 | Storrs . |
| 4,095,958 | 6/1978 | Caugley . |
| 4,268,274 | 5/1981 | Caugley ............................... 48/111 |

OTHER PUBLICATIONS

Baumeister, Mechanical Engineers' Handbook, 6th ed. McGraw Hill, 1968, pp. 10-53, 4-77 to 4-81 and 7-68 to 7-69.

Primary Examiner—Peter F. Kratz
Attorney, Agent, or Firm—Huebner & Worrel

[57] ABSTRACT

Apparatus for incinerating and gasifying biomass material by employing a flight conveyor having an upper run traversing a horizontal, perforated upper grate and a lower run traversing a perforated lower grate which is parallel to and beneath the upper grate, the material being continuously deposited on the upper grate and urged continuously across it by the upper run in a bed wherein the material is pyrolyzed into char and combustible gas and then being deposited on the lower grate in a bed continuously urged by the lower run over a source of air beneath the lower grate so that the char is continuously oxidized by air from the source producing hot products which pass upwardly from the lower grate through the bed on the upper grate, filtering particulates from the products and providing heat for the pyrolysis, and then sequentially over a source of steam beneath the lower grate so that the char continuously reacts with steam from the source to generate water gas which is collected substantially unmixed with other gases.

8 Claims, 6 Drawing Figures

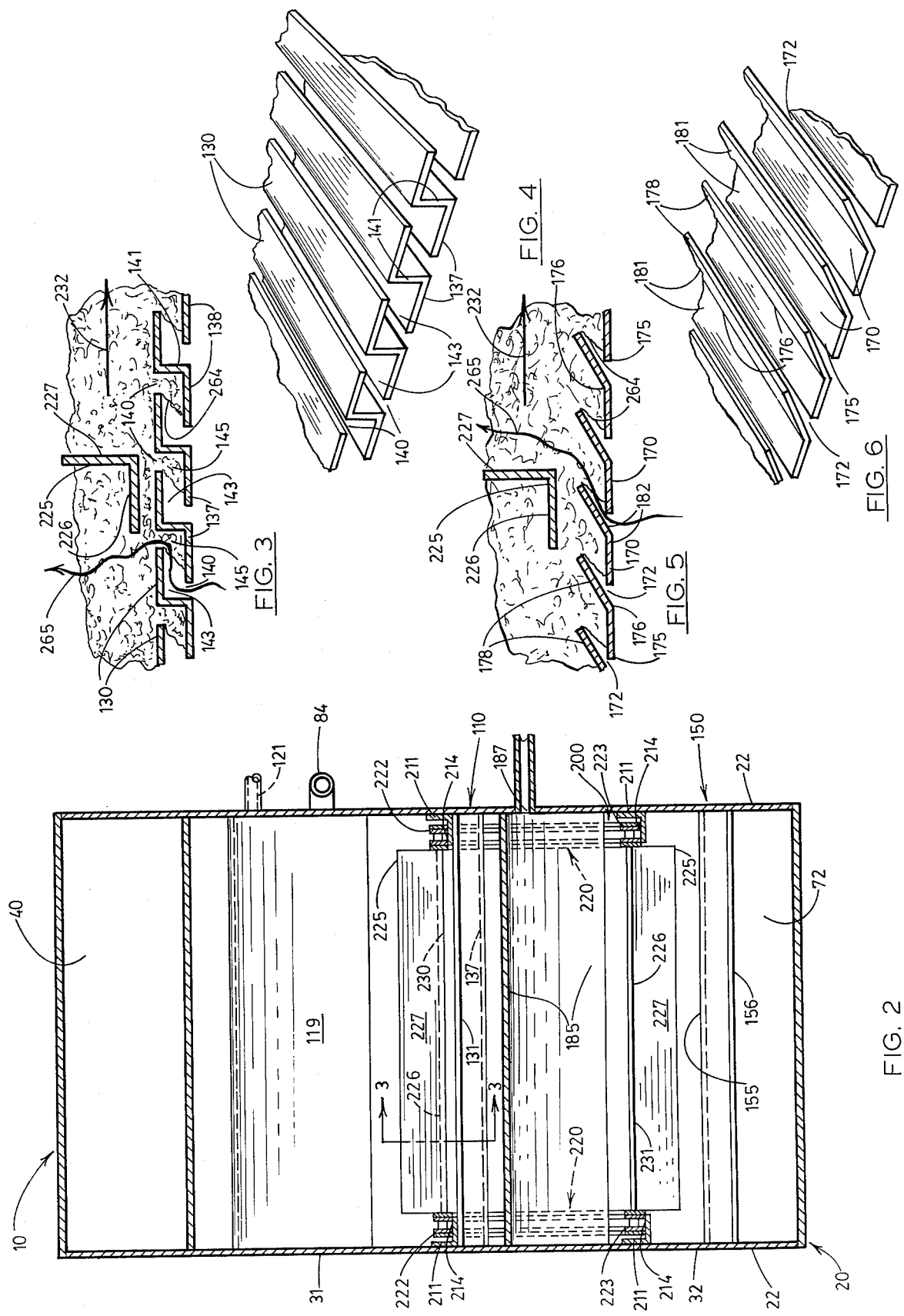

4,308,034

APPARATUS FOR INCINERATING AND GASIFYING BIOMASS MATERIAL

BACKGROUND OF THE INVENTION

1. Field of the Invention

The present invention relates to a method and apparatus for incinerating and gasifying biomass material, and more particularly to such a method and apparatus which generates water gas, gaseous products of pyrolysis, combustible char, and heat, while incinerating such material, said apparatus filtering particulate matter from gases discharged from it.

2. Description of the Prior Art

It is well known to dispose of biomass material by incineration with the production of heat and to pyrolyze various materials to produce char or useful gases. It is also well known to convert solid carbonaceous material into water gas or the like and to pyrolyze solid material for these and related purposes in a moving bed in which gases from one portion of the bed are passed through another portion of the bed.

However, prior art methods and apparatus for these and related purposes have various deficiencies such as being adapted only to one or a limited number of such purposes, emitting particulate matter unless external filtering or precipitating devices are employed, being relatively bulky, requiring complex controls and auxiliary devices, being suited for only one type of feed material, operating only with feed material that is substantially solid and is supplied in relatively large pieces, and generating energy only in the form of heat which is thus not usable in internal combustion engines or at a substantial distance from the apparatus.

These limitations of prior art methods and apparatus are particularly disadvantageous where it is desired to dispose of agricultural waste biomass material such as cotton gin trash, hulls, straw, wood shavings, and the like. The ash from such materials is in relatively small particles which are difficult to eliminate from gaseous products of combustion. This ash also melts at a relatively low temperature so that high temperatures cannot be used to obtain complete combustion. These and other biomass materials contain substantial moisture and have a high ash content so that little heat is generated by their combustion and auxiliary fuels are required for drying and to obtain complete incineration. These materials also vary greatly in composition so that methods and apparatus suited for one type of material do not satisfactorily handle other types. The composition of any one type of agricultural waste usually differs from time to time, particularly as to moisture content, so that a fully effective method or apparatus for only one type must be highly flexible in operation to accommodate the differences in fuel characteristics. Agricultural wastes and other biomass materials are often not free flowing due to their sticky composition and/or relatively light weight so that it is not practical to transport such materials gravitationally during processing.

It is, of course, known to prepare waste material for disposal by prior art methods and apparatus by prior drying and/or compacting of the material. However, such prior processing requires additional equipment and heat, electrical, or mechanical energy. The additional energy is often not in a form which can be generated economically at the site where the waste material accumulates.

PRIOR ART STATEMENT

Characterizing the closest prior art of which the applicant is aware and in conformance with 37 C.F.R. § 1.97 and § 1.98, attention is invited to the following patents and portions of a publication, copies of which are enclosed.

U.S. Patents

Mansfield, U.S. Pat. No. 3,434,933; Mar. 25, 1969.
Whitten et al U.S. Pat. No. 3,870,652; Mar. 11, 1975.
Storrs, U.S. Pat. No. 3,985,637; Oct. 12, 1976.
Caughey, U.S. Pat. No. 4,095,958; June 20, 1978.

Publication

Baumeister, Editor, *Mechanical Engineers' Handbook*, 6th ed., McGraw-Hill, 1958; page 10-53, pages 4-77 through 4-81, and pages 7-68 through 7-69.

The Mansfield U.S. Pat. No. 3,434,933 is believed relevant in its disclosure of an apparatus in which coal is pyrolyzed into coke in a bed on an upper run of an enclosed chain grate conveyor. The lower run of the grate does not support a bed. Hot gases pass downwardly through an initial portion of the bed from a succeeding portion of the bed. The initial portion serves to filter volatilized components from the gases by condensation on cooler coal in the initial portion. This patent also discloses the use of air boxes beneath a grate to pass air through a bed thereon and to supply air above a grate for the combustion of combustible gases escaping upwardly from the bed.

The Whitten et al U.S. Pat. No. 3,870,652 is believed relevant in its disclosure of the concept of passing air and steam upwardly through successive zones in a moving bed of carbonaceous material and the concept of controlling the temperature of the bed by the steam. The carbonaceous material is heated in the air zone in the presence of minimal air and the steam zone serves to quench the bed to a temperature of about 780° F. (415.6° C.).

The Storrs U.S. Pat. No. 3,983,637 is believed relevant in its disclosure of a process in which a moving bed transported on the upper run of an enclosed chain grate conveyor is pyrolyzed in an inert atmosphere by radiant heat. Useful products are removed from the bed downwardly through the grate into vessels disposed beneath the grate. The process is stated to be applicable to various biomass materials including sawdust, nut shells, vegetable matter, animal manure, and sewage sludge.

The Caughey U.S. Pat. No. 4,095,958 is believed relevant in its disclosure of a reactor for the gasification of "biomass" in a bed disposed in an inclined stationary grate and urged downwardly thereon by gravity. The grate is cooled by air to prevent melting of ash thereon. The nature of the biomass is not specifically defined, but the specification discusses in column 3, lines 51-55, the necessity of maintaining the proper fuel/air ratio in a "wood burning device" and with "wood or coal."

The *Mechanical Engineers' Handbook* publication is believed relevant in its description of the construction of a double-strand flight conveyor on page 10-53 and in its description on pages 4-77 through 4-81 and pages 7-68 through 7-69, of the chemistry and operation of apparatus for making water gas. This apparatus is stated to be a vertical cylinder with a "mechanical (rotating)" grate through which air and steam are passed alternately with gases generated during the passage of air being "passed to a waste-heat boiler, often mixing with more air to burn the CO content."

SUMMARY OF THE INVENTION

Accordingly, it is an object of the present invention to provide an improved method and apparatus for incinerating and gasifying biomass material.

Another object is to provide such a method and apparatus adapted to convert a substantial portion of a biomass material into combustible gas and simultaneously incinerate the balance of the material or to convert carbonaceous substances therein into char with the generation of useful heat.

Another object is to provide such a method and apparatus adapted for use with biomass material which is not free flowing.

Another object is to provide such a method and apparatus which is selectively adjustable in operation to utilize biomass material of a wide variety of types of constituent components and to utilize biomass material of any one type wherein the composition and moisture content fluctuate.

Another object is to provide such a method and apparatus which is adapted to dispose of agricultural waste biomass material while generating useful heat, combustible gases, and/or char therefrom.

Another object is to provide a method and apparatus for carrying out the above objects which is selectively adaptable while in operation to vary the relative amounts of combustible gases, useful heat, or char being produced.

Another object is to provide a method and apparatus for the continuous production of water gas from a moving bed containing carbonaceous material.

Another object is to provide a method and apparatus for carrying out the above objects which inherently filters particulate matter from gases discharged therefrom into the environment.

A further object is to provide a method for incinerating and gasifying biomass material which is adapted to be carried out in an apparatus having improved elements and arrangements thereof which is compact, economical to construct and operate, durable, and fully effective in carrying out its intended purposes.

BRIEF DESCRIPTION OF THE DRAWINGS

FIG. 2 is a transverse section of the apparatus taken from the position of line 2—2 of FIG. 1.

FIG. 3 is a fragmentary, somewhat enlarged, vertical section taken from the position of line 3—3 of FIG. 2, showing flight bars and a grate utilized in the apparatus together with biomass material rested thereon.

FIG. 4 is a fragmentary perspective view of the grate of FIG. 3.

FIG. 5 is a view similar to FIG. 3 showing an alternate form of grate.

FIG. 6 is a fragmentary perspective view of the alternate form of grate.

DESCRIPTION OF THE PREFERRED EMBODIMENT

Figure 1:
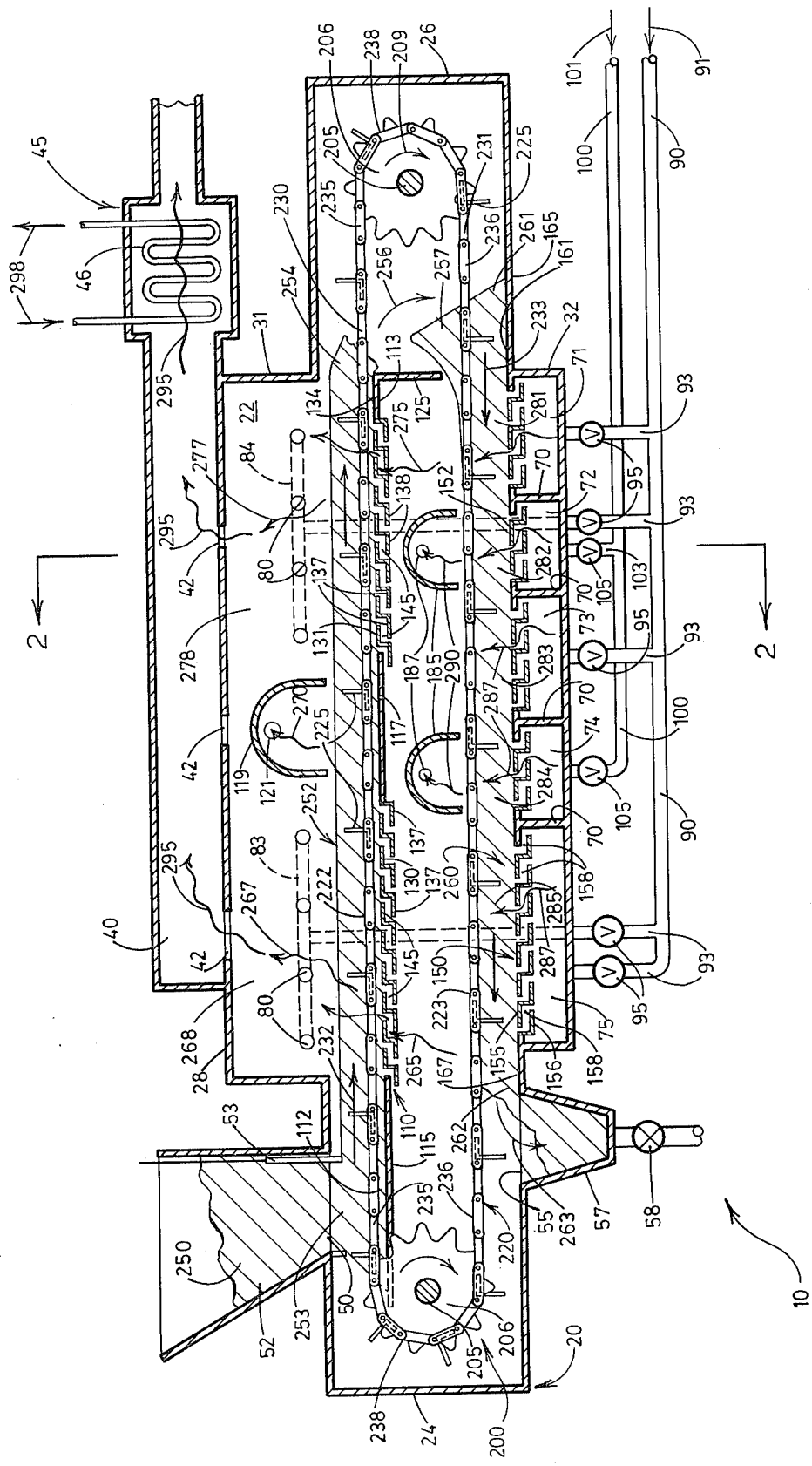
FIG. 1 is a diagrammatic longitudinal section of an apparatus for incinerating and gasifying biomass material and which embodies the principles of the present invention.

Referring more particularly to the drawings, in FIGS. 1 and 2 is shown an apparatus 10 for incinerating and gasifying biomass material, the apparatus embodies the principles of the present invention and performs the method thereof.

The apparatus 10 has a substantially airtight, horizontally elongated box-like enclosure indicated generally by the numeral 20 and having a pair of longitudinally extended side walls 22. The enclosure includes a hopper end portion 24 and an opposite end closed portion 26 interconnected by a central portion 28. The central portion has an upper section 31 and a lower section 32 which project, respectively, upwardly and downwardly from the end portions.

The enclosure 20 is provided with a horizontal duct 40 mounted on the upper section 31 and communicating therewith by a plurality of longitudinally spaced offtake openings 42. The end of the duct toward the hopper end portion 24 is closed and the opposite end of the duct communicates with a heat exchanger 45 having a pipe 46 through which a fluid, such as water or a gas, passes to pick up heat. The hopper end portion 24 of the enclosure 20 is provided with an upper or feed opening 50 spaced from the central portion 28. A downwardly constricted chute or feed hopper 52 opens downwardly into the opening. A vertically adjustable gate 53 extends downwardly between the side walls 22 from the side of this hopper toward the central portion. The hopper end portion is also provided with a lower or discharge opening 55 adjacent to the central portion. A discharge receptacle or hopper 57 converges downwardly from the discharge opening to a rotary valve 58. This valve is of a well-known type which controls the passage of particulate matter while substantially preventing the flow of gas.

The lower section 32 of the enclosure 20 is provided with four transversely extending bulkheads 70 which project upwardly from the floor of this section substantially to the elevation of the floors of the end portions 24 and 26. These bulkheads divide the lower portion longitudinally into five upwardly open, contiguous boxes numbered 71 through 75 sequentially in a direction from the end portion 26 toward the hopper end portion 24. The first box 71, the third box 73, and the fifth box 75 are air boxes and the second box 72 and the fourth box 74 are steam boxes. The first box and second box are thus a contiguous adjacent pair of such boxes in which the steam box is disposed in a direction from the closed end portion 26 of the enclosure toward its hopper end portion 24. The third box and the fourth box are a similar pair of these boxes disposed successively in this direction from the pair of the boxes consisting of the first and second box. The fifth box is substantially longer than the other boxes. The first and third boxes are of equal length. The steam boxes are equal in length and are somewhat shorter than the first and third boxes.

One of the side walls 22, for illustrative convenience the one shown in FIG. 1, is provided with a plurality of relatively small openings or secondary air inlets 80 spaced in a horizontal line across the upper section 31. These openings are disposed in two groups extended from each end of the upper section nearly to its center so that there are none of these openings located centrally of the upper section. The group of openings toward the hopper portion 24 is interconnected by a manifold 83 disposed outwardly of the enclosure 20 and the group toward the opposite end portion 26 is interconnected by a corresponding manifold 84.

The apparatus 10 is provided with an air manifold 90 extended beneath the closed end portion 26 and the central portion 28. This manifold is continuously supplied, as indicated by the arrow 91, with air under pressure from any suitable source. Five conduits 93 individually interconnect the air manifold with the air boxes 71, 73, and 75, and with the manifolds 83 and 84. Each conduit is provided with a valve 95 for shutting off and controlling the rate at which air flows to the corresponding box or manifold.

The apparatus 10 is provided with a steam manifold 100 disposed similarly to the air manifold 90 and continuously supplied, as indicated by the arrow 101, with steam under pressure from any suitable source. The steam manifold is individually interconnected with the steam boxes 72 and 74 by a pair of conduits 103, each conduit being provided with a valve 105 for controlling the flow of steam to these boxes.

The apparatus 10 has a substantially horizontal, rectangular, upper grate 110, shown in FIGS. 1 through 4, extending longitudinally within the enclosure 20 and spaced somewhat downwardly from the upper section 31. The grate is thus spaced downwardly of the air inlet openings 80 and the offtake openings 42. The grate extends transversely between the side walls 22 and is supported thereon in any suitable manner. This grate extends beneath the feed opening 50 in the hopper portion 24 of the enclosure 20 and through the central portion 28 to the closed end portion 26. The grate has a predetermined receiving end 112 within the hopper end portion and an opposite discharge end 113 juxtapositioned to the closed end portion. The grate has an end imperforate, planar section extended between its receiving end and the central portion of the enclosure. This imperforate section is disposed beneath the hopper 52 so that material gravitationally urged from the hopper is directed thereby onto this section.

The grate 110 has a central, planar, imperforate section 117 disposed between the two groups of air openings 80 which are individually served by the manifolds 83 and 84. This central imperforate section is provided with a downwardly open pyrolysis gas collecting bell 119 extending longitudinally of the grate above the imperforate section. The bottom of the bell is substantially aligned vertically with the roofs of the end portions 24 and 26 of the enclosure 20, and the top of the bell is spaced somewhat downwardly of the offtake openings 42. The bell extends transversely between the side walls 22, and the one of these walls having the air openings is provided with a pyrolysis gas eduction opening 121 communicating with the interior of the bell. The upper grate is provided with a transversely extended vertical plate 125 which extends downwardly at its discharge end from the plane of its imperforate sections 115 and 117 toward the lower section 32 of the enclosure 20.

The grate 110 has a first upper plate 130 and a second upper plate 131 which are substantially coplanar with the imperforate sections 115 and 117. The first plate extends between the imperforate sections to the plate 125. The grate thus has an upper surface 134 defined by the upper sides of its imperforate sections and the upper sides of its upper plates and extended between the receiving end 112 and the discharge end 113. The grate includes a pair of lower plates 137 individually disposed in downwardly spaced, parallel, and adjacent relation to the upper plates. The lower plates are longitudinally and transversely coextensive with the corresponding upper plate, and the undersides of the lower plates provide a lower surface 138 of the grate.

As best shown in FIGS. 3 and 4, the upper plates 130 and 131 and the lower plates 137 are perforated by a plurality of substantially congruent, elongated, rectangular slots 140. The slots extend between the side walls 22 and each slot thus has an edge disposed toward the receiving end 112 and an opposite edge disposed toward the discharge end 113. The slots are spaced equally along the grate, the widths of the slots being substantially less than the portions of the plates between the slots, as best shown in FIGS. 3 and 4. The numbers and disposition of the slots are substantially the same in the corresponding upper and lower plate. However, the slots of the lower plate are offset transversely in relation to the slots in the upper plate so that the discharge end edge of each slot in the upper plate is substantially aligned vertically with the receiving end edge of a corresponding slot in the lower plate. A plurality of vertical plates extend transversely between the side walls 22 and individually interconnect each vertically aligned pair of edges. The grate is thus divided into a plurality of compartments 143 defined by the side walls, the upper plates, the lower plates, and the vertical plates. All of these plates are fixedly connected to each other in any suitable manner. A structure is thus provided wherein each slot in the upper plate communicates individually through one of the compartments with a corresponding one of the slots in the lower plate. The compartments and their corresponding slots thus define a plurality of openings 145 through the grate between its surfaces 138 and 134. The relative widths of the slots and the portions of the plates therebetween are such that there is substantial overlap of the upper plate and the lower plate longitudinally of the grate between the pair of slots communicating through each compartment.

The apparatus 10 has a horizontal, rectangular, lower grate 150 extending longitudinally beneath the upper grate 110, as shown in FIGS. 1 and 2. The lower grate has a perforate section 152 disposed within the central portion 28 of the enclosure 20 between its end portions 24 and 26 and, therefore, above the boxes 71 through 75. This perforate section is supported on the side walls 22 in any suitable manner and has a structure substantially identical to the structure, as shown in FIGS. 3 and 4, formed by one of the plates 130 or 131 of the upper grate with its corresponding lower plate 137 and vertical plates 141. The lower grate thus has an upper surface 155 and a lower surface 156, which are interconnected by openings 158. The lower surface is disposed so as to extend upwardly over the boxes 71 through 75 in covering relation thereto, so that each opening communicates downwardly with the box beneath it. The lower grate has an imperforate section 161 having an upper surface which is substantially coplanar with the upper surface of the perforate section and forms a portion of the floor of the closed end portion 26 of the enclosure. The lower grate terminates within the closed end portion of the enclosure at a receiving end 165 of the lower grate. This receiving end is thus extended outwardly of and beneath the discharge end 113 of the upper grate 110 in downwardly adjacent relation to this discharge end. The lower grate has a discharge end 167 disposed where its perforate section 152 is juxtapositioned to the hopper end portion 24 of the enclosure. The discharge end of the lower grate is thus disposed adjacent to the discharge opening 55 and upwardly of the discharge hopper 57 in downwardly adjacent relation to the receiving end 112 of the upper grate.

In FIG. 4 is shown an alternate perforate grate structure which may be employed instead of the structure, shown in FIGS. 1 through 4, which is formed by the plates 130, 131, 137, and 141 of the upper gate 110 and is utilized in the perforate section 152 of the lower grate 150. The alternate structure has a plurality of substantially horizontally elongated planar plates 170 extended transversely of the grates between the side walls 22. The plates are spaced longitudinally of their respective grates and define between them elongated openings 172 functionally corresponding to the openings 145 and 158. Each plate has a leading edge 175 disposed toward the receiving end 112 or 165 of its respective grate and has a trailing edge 176 disposed toward the discharge end 113 or 167 of this grate. The alternate grate structure includes a plurality of auxiliary plates 178 individual to the planar plates and continuous with their trailing edges. Each auxiliary plate extends from the corresponding trailing edge in a direction from the receiving end toward the discharge end of the corresponding grate and upwardly and over the leading edge of the next adjacent planar plate for a substantial distance. The leading plate thus is overlapped in a direction longitudinally of the grates by the trailing edge of this adjacent plate. The upper surfaces of the planar and auxiliary plates provide an upwardly disposed surface 181 which corresponds functionally to the upwardly disposed surfaces 134 and 155, and a downwardly disposed surface 182 corresponding to the surfaces 138 and 156. The openings 172 of the alternate grate structure thus extend between these upwardly and the downwardly disposed surfaces.

As shown in FIGS. 1 and 2, the apparatus 10 is provided with a pair of downwardly open water gas collecting bells 185 individually disposed above the steam boxes 72 and 74 and extended between the side walls 22. The bottom of each bell is spaced substantially upwardly of the lower grate 150 and the top of each bell is disposed below the upper grate 110. The one of the side walls 22 having the openings 80 is provided with a pair of water gas eduction openings 187 opening individually into the bells.

The apparatus 10 has a flight conveyor indicated generally by the numeral 200 and disposed within the enclosure 20 together with the upper grate 110 and the lower grate 150. The conveyor includes a pair of horizontal shafts 205 extended transversely of the grates and rotationally mounted on the side walls 22. One of the shafts extends across the hopper end portion 24 and has its axis spaced somewhat outwardly of the feed opening 50 from the upper grate. The other shaft extends across the end portion 26 of the enclosure and is spaced substantially outwardly of the discharge end 113 of the upper grate. Each shaft has a pair of sprockets 206 fixedly mounted thereon and disposed individually in closely adjacent relation to the side walls. The sprockets are substantially equal in diameter and the shafts have their axes at substantially the same elevation. The elevation of the axes and the diameter of the sprockets is such that the upper side of each sprocket is spaced somewhat upwardly of the upper surface 134 of the upper grate and the lower side of each sprocket is spaced somewhat downwardly of the bottom of the bells 185. One of the shafts is continuously rotationally driven by any suitable power drive so that this sprocket is rotated in a direction which is clockwise in FIG. 1, as indicated by the arrows 209.

The conveyor 200 includes four angle members 211, shown in FIG. 2, extending longitudinally of the enclosure 20 between the sprockets 206. A pair of the members is mounted on each side wall 22 with one leg of each member providing a horizontal planar track 214 extended from the corresponding one of the walls toward the opposite wall a distance approximately equal to the distance the adjacent sprockets are spaced from the one wall. One member of each of these pairs is disposed so that its track is elevationally aligned with the upper sides of the sprockets and the other member of the pair is disposed so that its track is elevationally aligned with the lower side of the sprockets.

The conveyor 200 has a pair of endless chains 220 individually extended about the pair of sprockets adjacent to each of the side walls 22. The chains thus rotationally interconnect the sprockets and the shafts 205. The chains have individual upper runs 222, which are supported on the upper pair of the tracks 214, and have individual lower runs which are supported on the lower pair of these tracks. The conveyor is provided with a plurality of elongated, horizontal flight bars 225, shown in FIGS. 1, 2, 3, and 5, which are spaced equally along the chains and extended between the chains in a direction parallel to the slots 140. Each bar is of L-shaped cross section having one leg 226 extended parallel to the chain and another leg 227 which extends outwardly from the conveyor and vertically from the chains at their upper runs and lower runs. The outwardly extended legs project from the chains a distance somewhat less than the spacing of the bells 119 and 185 from their respective grates 110 and 150. The ends of each flight bar are individually mounted on a transversely aligned pair of links of the chains so that the vertical legs extend upwardly from the upper run of the chain and downwardly from its lower run. The legs 226 are thus disposed in upwardly adjacent, parallel relation to the upper surface 134 of the upper grate 110, and the ends of the legs 227 are disposed in upwardly adjacent parallel relation to the upper surface 155 and the imperforate portion 161 of the lower grate.

The conveyor 200 thus includes an elongated upper run 230, corresponding to the upper runs 222 of the chains 220, and an elongated lower run 231 corresponding to the lower runs 223 of the chains. On the upper conveyor run, the flight bars 225 move continuously longitudinally of the upper grate 110 in a direction from the receiving end 112 toward the discharge end 113, as indicated by the arrows 232. On the lower conveyor run, the bars move continuously longitudinally of the lower grate 150 in a direction from its receiving end 165 toward its discharge end 167, as indicated by the arrows 233. The runs of the conveyor are supported on the tracks 214 and are thus substantially parallel. Each run of the conveyor has a plurality of the flight bars 225 spaced along it and extended normally of the direction in which the runs move across the corresponding grates so that the flight bars traverse the grates. The upper conveyor run has a pair of opposite end portions 235 extended oppositely outwardly beyond the ends 112 and 113 of the upper grate to the sprockets 206, and the lower conveyor run has a corresponding pair of end portions 236 extended oppositely beyond the ends 165 and 167 of the lower grate. The pairs of these end portions which are extended toward the same sprocket are united by a return bend 238 wrapped about the sprockets, so that the conveyor is endless. It will be noted that the end imperforate section 115 of the upper grate is extended beneath the upper run of the conveyor toward the adjacent return bend and that the discharge hopper 57 is disposed between this return bed and the discharge end 167 of the lower gate.

OPERATION

The operation of the described embodiment and method of the present invention are believed to be clearly apparent and are briefly summarized at this point. The apparatus 10 is provided in the feed hopper 52 with a supply of carbonaceous, particulate feed material 250. This material may be any type of such material. However, the apparatus is particularly advantageous for use with biomass waste material, such as particulate agricultural waste matter, where the biomass material is characterized by having particles of relatively small size and light weight, by having moisture and composition which varies with time, by having ash melting at a low temperature, and by not being free flowing. Cottonseed trash, sawdust, rice hulls, almond hulls and shells, walnut hulls and shells, shredded paper, straw, pistachio hulls, wood shavings, olive pits, peach pits, sugar beet and grape pulp, and the like, characterize suitable biomass material.

In describing the operation, the mechanical movement of the material through the apparatus will first be described. The chemical and other changes which the material undergoes, which may vary with the material or with the desired products, will be described subsequently.

The feed material 250 is continuously gravitationally deposited from the hopper 52 through the opening 50 onto the upper surface 134 of the upper grate 110 at its imperforate end section 115. The material is deposited between the upper runs 222 of the chains 220 in the path of the flight bars 225 as the bars move in the direction 232 with the upper run 230 of the conveyor 200. The flight bars drag through the material forming it into an upper horizontal bed 252 rested on the upper grate and having a receiving end 253 and a discharge end 254 disposed at, respectively, the receiving end 112 and the discharge end 113 of the upper grate. The thickness of the bed is controlled by adjustment of the gate 53. The flight bars urge the bed in a continuous stream from its receiving end toward its discharge end. At the discharge end, the processed material in the upper bed is urged outwardly by the flight bars from the upper grate so that the material is gravitationally deposited, as indicated by the arrow 256, from between the upper runs of the chains downwardly past the plate 125 onto the upper surface 155 of the lower grate 150. The processed material is there temporarily disposed in a pile 257 rested between the lower runs 223 of the chain on the imperforate portion 161 of the lower grate adjacent to its receiving end 165.

The flight bars 225 in the lower run 231 of the conveyor 200 drag through the pile 257 and form the processed material therein into a lower horizontal bed 260 rested on the lower grate 150. The lower bed has a receiving end 261 and a discharge end 262 disposed at, respectively, the receiving end 165 and the discharge end 167 of the lower grate. The lower bed thus extends beneath the upper bed 252 in downwardly spaced relation thereto with the receiving end and the discharge end of the lower bed adjacent, respectively, to the discharge end 254 and the receiving end 253 of the upper bed. As the flight bars on the lower run 231 of the conveyor 200 move in the direction indicated by the arrows 233, the bars urge material in the lower bed toward its discharge end. The material is further processed in a continuous stream in the lower bed and the residual material remaining in this bed at its discharge end is urged therefrom by the flight bars into the discharge opening 55 where it is gravitationally deposited into the hopper 57, as indicated by the arrow 263, and removed through the valve 58.

Referring now to FIGS. 3 and 5, it is seen that the material rested on the grate 110 or 150 has a "slump line" indicated by the numeral 264. This line is disposed at a predetermined angle to the vertical which is characteristic of the material. With the grate structure shown in FIG. 3, the overlap of the portions of the upper plate 131 and of the lower plate 137 between the slots 140 of the compartment 143 are such that material falling through the upper slot does not extend longitudinally of the grate to the slot in the lower plate. With the alternate grate structure shown in FIG. 3, the overlap of each auxiliary plate 178 over the next adjacent one of the plates 170 is such that material falling through the one of the openings 172 between the plates does not extend to the leading edge 175 of the auxiliary plate. The overlapping construction of both of these grate structures thus provides the openings 145 or 172 through which gases and the like can pass upwardly through the grate and yet biomass material supported by the grate does not gravitate downwardly through these openings.

Certain chemical and other changes are undergone by the material 250 in its passage sequentially along the upper bed 252 and along the lower bed 260. In general, the material undergoes oxidation or combustion in the lower bed producing heat and substantially incombustible hot products of combustion which move upwardly toward and through the upper bed and contribute to the processing of the material on the upper bed.

More specifically, as the material 250 is transported from the feed hopper 52 of the first upper plate 130, hot products, indicated by the arrow 265, pass upwardly through the openings 145 in the upper grate through the portion of the upper bed 252 disposed above this plate and are there dried and pyrolyzed by heat applied to the material from the products. Simultaneously, particulate matter in these products, typically particles of ash from the combustion on the lower bed 260, is filtered by the upper bed while gases in the hot products which do not react with the material in the upper bed pass upwardly therefrom. If the composition of the feed material is suitable, particularly when its moisture content is relatively low, pyrolysis on the first plate produces combustible gaseous products which pass upwardly toward the offtake openings 42, as indicated by the arrow 267, from the upper bed together with the incombustible gaseous products from the lower bed 260. Under these circumstances, sufficient air is supplied through the openings 80 connected to the manifold 83 for combustion with the combustible gaseous products in a first combustion region 268 disposed in upwardly adjacent relation to the upper bed. The rate at which air is supplied is controlled by the one of the valves 95 associated with this manifold so as to give complete combustion of the gases without providing an undue amount of excess air. Heat from this combustion region contributes to pyrolysis of the material in the upper bed and hot products of combustion are generated which pass upwardly from the region toward the offtake openings together with the filtered gaseous products of combustion from the lower bed which have passed through the upper bed.

Partially pyrolyzed material in the upper bed 157 moves in a continuous stream from the first plate 130 onto the central imperforate section 117 of the upper grate 110 and beneath the bell 119. This bell is thus disposed oppositely of the upper bed from this imperforate section. The material is further pyrolyzed above the imperforate section by heat conducted through it and the bell 119 and by heat from the material itself. If the nature of the material is such that this further pyrolysis produces a significant quantity of combustible gases, these gases are educted from the bell through the opening 121 as indicated by the arrow 270. If an insufficient quantity of combustible gases is produced, or if it is not possible to use them when removed from the apparatus 10, these gases are not educted and pass from the bell into the enclosure 20. During pyrolysis on the central imperforate section, the material of the upper bed 252 decreases in temperature since the material is not subject to direct heating by hot products from the lower bed 260. After the temperature has fallen to the point where a significant quantity of combustible gases is no longer produced, the material moves from the imperforate section onto the second upper plate 131.

As the material in the upper bed 252 passes over the second plate 131 of the upper grate 110, the material is further subject to pyrolysis by hot products of combustion which pass from the lower bed 260, as indicated by the arrows 275. The reactions and processing at the second plate are similar to those at the first plate 130, with particulate matter being filtered by the upper bed from the products from the lower bed and with combustible pyrolysis gases being produced. These gases pass upwardly from the bed, as indicated by the arrow 277, toward an offtake opening 42. If desired, these gases undergo combustion in a second combustion region 278 above the second plate with air supplied through the openings 80 which are connected to the manifold 84. The flow of this air is controlled by the associated one of the valves 95. Since the material in the upper bed has previously undergone pyrolysis, this material is pyrolyzed above the second plate substantially into char consisting of ash and of carbon from the carbonaceous matter supplied with the feed material 250. This resultant char is deposited, as indicated by the arrow 256, into the lower grate and there formed into the lower bed 260 and transported in the direction indicated by the arrows 232.

As the char is transported in the lower bed 260 across the lower grate 150, the char passes sequentially through a first combustion zone 281 disposed above the first box 71; a second zone of the bed or first reaction zone 282 disposed above the second box 72; a second combustion zone 283 above the box 73; a second reaction zone 284 above the box 74; and a third combustion zone 285 above the box 75. The first and second reaction zones are thus disposed individually in the direction of movement of the lower bed from the correspondingly numbered combustion zones. The three combustion zones are disposed individually above the three boxes connected to the air manifold 90 and the two reaction zones are individually disposed above the two boxes connected to the steam manifold 100. Each box is, therefore, disposed oppositely of the lower grate from the corresponding zone of the lower bed. The flow of air or steam from these manifolds to the boxes connected thereto is shut off or controlled as desired by the appropriate one of the valves 95 or 105. Air or steam admitted to each of the boxes passes upwardly through the openings 158 in the lower grate, as indicated by the arrows 287, and is applied to the zone of the bed corresponding to the box. The upward passage of air or steam in each zone is through adjacent openings in the grate which are disposed above the box. Oxidation of the char occurs in the lower bed in the zones where air is supplied since the flow of air results in a substantial absence of steam in these zones. This reaction generates ash and incombustible flue gas, and heat from this reaction is utilized for pyrolysis in the upper bed 252 as previously described and to raise the temperature of the mass itself. Another reaction, shortly to be described, of carbon in the char, occurs to form water gas in the zones where steam is supplied.

In the combustion zones 281 and 283, the flow of air is controlled so that a first portion of the char in each zone undergoes oxidation sufficient to heat a second portion of the char, that portion remaining after the oxidation, to a temperature of about 900° C. (1,652° F.) at the location where the second portion moves into the adjacent reaction zone 282 or 284. In the reaction zones, the steam reacting with hot carbon in the second portion of the char, forming a mixture of the combustible gases hydrogen and carbon monoxide according to the equation:

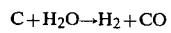

$$C + H_2O \rightarrow H_2 + CO$$

This mixture, which is known in the art as "water gas", passes upwardly from the reaction zone, as indicated by the arrows 290, and is collected in the one of the bells 185 above the zone for eduction through the corresponding opening 187. Since each bell extends along the grate above the corresponding box 72 or 74 and is spaced somewhat upwardly of the lower grate 150, the bell is upwardly adjacent to the bed and collects the water gas from the reaction zone without substantial admixture of the incombustible flue gas from the adjacent pair of the combustion zones 281, 283, or 285.

Since the water gas forming reaction is endothermic, the char in the reaction zone drops in temperature as steam is passed through it. This temperature must not fall below about 700° C. (1,292° F.) if a significant quantity of water gas is to be produced. The flow of steam to each reaction zone 282 or 284 is, therefore, controlled by the corresponding one of the valves 105 so that the temperature of the char in the lower bed 252 is not lowered below about 700° C. as the char passes from the reaction zone.

Since the temperature of the bed 260 in the first reaction zone 282 is thus limited to a range of 900° C. to 700° C., if it is desired to produce more water gas than can be produced from one combustion zone and a corresponding reaction zone, it is necessary to raise the temperature of the bed again to about 900° C. by oxygen in the substantial absence of steam in another combustion zone, the zone 283, before steam is again passed through the bed in the substantial absence of oxygen in the zone 284. The apparatus 10 is thus provided with two of the adjacent, paired combustion and reaction zones wherein the lower bed is passed successively through a combustion zone and a reaction zone. It is to be understood, however, that more than two such paired zones could be provided in an apparatus similar to the apparatus 10 if the apparatus having a plurality of the zones is to be used with biomass feed material 250 of a type wherein sufficient water gas would be produced to make such an arrangement advantageous. Water gas from the openings 187 and/or combustible gaseous products of pyrolysis from opening 121 can be conveyed in any suitable manner to a location which is either adjacent to or remote from the apparatus 10 and there used for fuel to produce heat or power.

From the second reaction zone 284, the material in the lower bed 260 passes in a continuous stream to the third combustion zone 285 where air is again passed upwardly through the bed for combustion of combustible material remaining in the bed after combustion in the zones 281 and 283 and production of water gas in zones 282 and 284. If desired, the flow of air to the third combustion zone is selectively controlled by the associated one of the valves 95 so that the remaining combustible material is completely incinerated with the further production of incombustible flue gas and the residual material received in the discharge hopper 57 is substantially entirely ash. However, if it is advantageous to produce char from the biomass feed material 250, the flow of the air is reduced to limit combustion so that the residual material removed at the output end 262 is char. It should be noted that, for maximum production of char, the steam valves 105 can be closed so that only air is passed upwardly through the lower bed and the flow of this air limited by the appropriate valves 95 with only enough combustion occurring in the lower bed to provide the necessary heat for pyrolysis in the upper bed 252. These valves can be selectively utilized to control the air and steam flow to produce complete incineration of the material 250, to produce the maximum amount of char, to produce the maximum amount of water gas, or to vary the ratio of these products to the extent practical with the particular type of feed material being supplied to the feed hopper 52.

The flue gas and particulate products of combustion from the second combustion zone 283 and the third combustion zone 285 pass upwardly from the lower bed 260, as indicated by the arrow 275, together with the products indicated by the arrow 265 to the upper bed 252 to pyrolyze the material therein as previously described and for filtration of particulate material by the upper bed. The gaseous products from the lower bed pass through the upper bed and mix with any gaseous products of pyrolysis therefrom and with products of combustion from the combustion regions 268 and 278. These mixed products pass, as indicated by the arrow 295, through the offtake openings 42, and the duct 40 to the heat exchanger 45 for recovery of heat in the products by a fluid passing through the piping 46, as indicated by the arrows 298.

The residual ash and/or char remaining in the lower bed 260 from the third combustion zone 285 are removed from the lower grate 150 at its discharge end 167 by the flight bars 225 on the lower run 223 of the conveyor and deposited in a continuous stream into the hopper 57 as indicated by the arrow 263.

The method and apparatus 10 of the present invention thus provide for the gasification and incineration of carbonaceous biomass material which is even moist and not free flowing by use of the flight bar conveyor 200 moving across the grates 110 and 150. The valves 95 and 105 adapt the apparatus, while in operation, for adjustment to feed material of a variety of types and varying composition and to vary the relative amounts of combustible gas, char, and/or useful heat produced. The disposition of the upper bed 252 directly above the lower bed 260 results in the apparatus being compact and inherently filtering particulate matter from products resulting from combustion occurring therein. Perhaps more significantly, such arrangement makes for the more efficient transfer of heat from the lower bed to the upper bed by radiation and connection.

When high energy fuel is employed, the apparatus is preferably somewhat differently configured. The offtake openings 42 are closed. The air valves 95 in the conduits 93 to the manifolds 83 and 84 are closed as is the opening 121. The valves 95 in the conduits 93 leading to the air boxes 71, 73, and 75, are regulated to limit the temperature of the char bed to not in excess of 900° C. The resulting oxygen deficient combustion then results in the production of combustible producer's gas. ($CO + N_2 + CO_2$) which is drawn off through the opening 187. The producer's gas can subsequently be burned to derive energy therefrom. Pyrolyzed gas from the upper bed resulting from contact of the carbonaceous material with the hot grate 110, is drawn downwardly through the grate and beneath the bells 185 for passage through the openings 187. Water gas ($CO + H_2$) is generated and drawn off as previously described.

Although the invention has been herein shown and described in what is conceived to be the most practical and preferred method and apparatus, it is recognized that departures may be made therefrom within the scope of the invention, which is not to be limited to the illustrative details disclosed.

Having described my invention, what I claim as new and desire to secure by Letters Patent is:

1. An apparatus for incinerating and gasifying particulate biomass material comprising a substantially air tight enclosure containing:
   A. an endless conveyor having a substantially horizontal, elongated upper run, a substantially horizontal elongated lower run disposed in downwardly spaced, substantially parallel relation to the upper run, and a plurality of transversely extended, horizontal flight bars;
   B. an upper grate having an upwardly disposed surface downwardly adjacent to the upper run of the conveyor, a plurality of openings extending through said grate for the passage of gas therethrough, a predetermined receiving end, and an opposite discharge end;
   C. a lower grate having an upper surface downwardly adjacent to the lower run of the conveyor, a plurality of openings extending through said grate for the passage of air therethrough, a predetermined receiving end disposed beneath the discharge end of the upper grate, and an opposite discharge end;
   D. means for continuously driving the conveyor so that the flight bars move across the upper and lower grates from the receiving ends to the discharge ends thereof;
   E. means for continuously depositing the biomass material on the upwardly disposed surface of the upper grate at the receiving end thereof to form an upper bed rested on the grate which continuously is urged by the flight bars on the upper run to move from the receiving end to the discharge end, said material being substantially pyrolyzed into char on the upper grate and being gravitationally deposited from the discharge end thereof onto the receiving end of the lower grate into a lower bed rested thereon and urged by the flight bars traversing the lower grate to move from said receiving end to said discharge end thereof; and F. means for continuously supplying air upwardly through the openings in the lower grate beneath a predetermined combustion zone of the lower bed for combustion with the char disposed in said zone, said combustion generating hot products of combustion which pass upwardly from the lower bed and through the openings in the upper grate for pyrolysis of the material in the upper bed.

2. The apparatus of claim 1 in which the grates each comprise a plurality of substantially horizontal, elongated, planar plates extended transversely of their respective runs of the conveyor disposed in transversely spaced relation longitudinally of said runs to define therebetween the openings for the passage of air upwardly therethrough, said planar plates having leading edges disposed toward the receiving ends of their respective grates and trailing edges disposed toward the discharge end of their respective grates, and auxiliary plates individual to the planar plates continuous with said trailing edges of their respective planar plates and extended in the direction of flight bar travel upwardly and over the leading edges of their respective next adjacent planar plates.

3. The apparatus of claim 1 wherein:
A. the upper run and the lower run of the conveyor each extends horizontally outwardly beyond the grates and the conveyor includes a pair of return bends interconnecting the adjacent end portions of the runs;
B. the receiving end of the lower grate extends outwardly of the discharge end of the upper grate so that the char is urged outwardly from the discharge end by the flight bars and drops downwardly from said discharge end onto the upper surface of the lower grate adjacent to the receiving end thereof;
C. the receiving end of the upper grate is provided with a planar, imperforate extension extended beneath the upper run toward the adjacent return bend;
D. said means for depositing the feed material on the upper surface of the upper grate includes a chute directed onto said extension; and
E. the apparatus includes a receptacle disposed downwardly of the lower run between the discharge end thereof and the adjacent return bend to receive residual material from the lower bed, the residual material being urged from said end by the flight bars.

4. The apparatus of claim 1 wherein the substantially airtight enclosure includes:
A. a feed opening above said receiving end through which said material is deposited on the upper surface of the upper grate;
B. a discharge opening adjacent to said discharge end of the lower bed to receive residual material from the lower bed; and
C. an opening disposed upwardly of the upper grate for the eduction from the enclosure of gaseous products of combustion from the bed on the lower grate and of gaseous products of pyrolysis from the upper bed.

5. The apparatus of claim 1 wherein the biomass material and the char are carbonaceous and a first portion of the char undergoes combustion in the combustion zone heating a second portion of the char, and the apparatus further comprises:
A. means for continuously passing steam upwardly through openings in the lower grate beneath a predetermined reaction zone of the lower bed which is substantially contiguous with the combustion zone and disposed therefrom in a direction toward the discharge end so as to receive the heated second portion of the char from the combustion zone, the steam reacting in the reaction zone with the heated char to form water gas which passes upwardly from the reaction zone; and
B. means disposed upwardly of the reaction zone for collecting the water gas.

6. The apparatus of claim 5 wherein the means for supplying air includes an air box mounted beneath the lower grate oppositely of the combustion zone and communicating with the openings therebeneath; the means for supplying steam includes a steam box mounted beneath said grate oppositely of the reaction zone and communicating with the openings therebeneath; and the means for collecting the water gas includes a downwardly open bell disposed in upwardly adjacent relation to the reaction zone.

7. The apparatus of claim 1 wherein the upper grate includes an imperforate section on which pyrolysis of the material of the upper bed occurs forming gaseous combustible products of pyrolysis, the apparatus further comprising a downwardly open bell disposed in upwardly adjacent relation to the upper bed in juxtaposition to said imperforate section for collection of said combustible products of pyrolysis.

8. The apparatus of claim 1 wherein combustible gaseous products are formed by said pyrolysis of the material in the upper bed, the substantially air tight enclosure includes:
A. a substantially gas-tight enclosure surrounding the upper grate and extending upwardly therefrom having an off-take opening disposed upwardly of the upper grate; and
B. means for admitting air into said enclosure upwardly of the upper grate for combustion with said products generating heat which contributes to said pyrolysis and generating products of combustion which pass through the offtake opening together with products of combustion from the combustion zone of the lower bed which have passed through the upper bed.

* * * * *